United States Patent [19]

Horner et al.

[11] Patent Number: 4,757,721

[45] Date of Patent: Jul. 19, 1988

[54] TORQUE TRANSDUCERS

[75] Inventors: Ronald F. Horner; David O. Crane, both of Warwickshire, United Kingdom

[73] Assignee: Crane Electronics Limited, Nuneaton, England

[21] Appl. No.: 937,981

[22] Filed: Dec. 4, 1986

[30] Foreign Application Priority Data

Dec. 17, 1985 [GB] United Kingdom ............... 8530993

[51] Int. Cl.$^4$ ..................... G01L 3/10; H01R 39/18
[52] U.S. Cl. .................... 73/862.35; 73/773; 439/29
[58] Field of Search .............. 73/862.33, 862.35; 374/154; 307/145; 310/219, 238, 248, 249, 251, 252; 439/18, 28, 29

[56] References Cited

U.S. PATENT DOCUMENTS

| 421,320 | 2/1890 | Schmid et al. | 310/238 |
| 3,686,514 | 8/1972 | Dube et al. | 310/232 |
| 4,296,345 | 10/1981 | Haberl | 310/219 |
| 4,544,039 | 10/1985 | Crane | 73/862.35 X |
| 4,648,282 | 3/1987 | Alender et al. | 73/862.35 X |

FOREIGN PATENT DOCUMENTS

| 1132231 | 6/1962 | Fed. Rep. of Germany | 307/145 |
| 8640 | of 1913 | United Kingdom | 310/249 |

Primary Examiner—Charles A. Ruehl
Attorney, Agent, or Firm—Chilton, Alix & Van Kirk

[57] ABSTRACT

A torque transducer has a torque transformable shaft 2 with strain guages 10, 12 electrically connected to sliprings 58 separated by spacers 60. A torque related signal is transmittable via the sliprings to a brush arrangement 22 having flexible strips 24 pulled by tension from springs 26 against the periphery of the sliprings 58, with the strips 24 tracked between the spacers 60 onto the sliprings 58.

11 Claims, 6 Drawing Sheets

TORQUE TRANSDUCERS

DESCRIPTION

1. Field of the Invention

The invention relates to torque transducers for use for example in improving the fastening of nuts and bolts to a reliable standard. The transducers may be used to calibrate the tools used for fastening or may be combined as an attachment to or as integral part of the tool.

2. Background of the Invention

Torque measurement by strain gauges attached to torque transmitting shafts has been subject to signal noise as a result of slip ring - brush contact variation. The noise can be particularly obtrusive where impact or impulse torque is applied suddenly placing the shaft for short moments under considerable strain.

U.S. Pat. No. 4,544,039 describes a brush-based system in which special resilient mounting of the brushes is used to avoid signal noise. The patented system is fairly complex.

The invention seeks to improve such torque transducers in a first aspect of the invention. The invention may provide, in the second aspect of the invention, a slip ring/brush assembly which may be useful outside the torque transducing field in other applications, particularly where shafts revolve intermittently.

3. Summary of the Invention

The invention firstly provides a torque transducer having a torque deformable shaft and a strain sensing means thereon, a torque related signal being transmittable from the shaft through a slip ring on the shaft and a brush arrangement in which the brush arrangement includes a flexible strip pulled under tension against the slip ring periphery. By using a flexible strip wrapped around a slip ring, electrical contact can be maintained even if the shaft transmits torque intermittently. It is though that there is a minimum chance of loss of contact due to bounce of the strip. If the strip seeks to lift off from the slip ring at one position, its contact pressure elsewhere is likely to increase. The strip may oscillate transversely of the shaft to accomodate any shaft run-out without losing contact. A low signal to noise ratio may be obtained facilitating the transmission by the slip ring/brush arrangement of an unamplified torque related signal, in turn promoting a compact construction of the rotatable parts.

The strip may be in contact with the slip ring over a large angle of at least 180°, preferably at least 250°. The strip ends can then be anchored in close proximity on one side of the slip ring with the strip engaging the other side of the slip ring.

The strip may be in electrical contact with the slip ring at spaced positions but preferably provides a continuous electrical contact surface.

The flexible strip is preferably of a simple laminated construction with a flexible, non-conductive, suitably plastic, backing strip adhered by two-sided adhesive tape to a layer of substantially pure carbon for contacting the slip ring. The strip conforms readily to the slip ring periphery. The carbon has a low friction and light tension can be used. The adhering surfaces are urged together as a result of the tension. The carbon material is sandwiched between the backing strip and the slip ring so that good electrical contact may be achieved. If the carbon layer wears through, the plastic backing strip will not damage the slip ring.

Suitably one end of the strip is fixed and electrically connected to associated circuitry whilst the other end is placed and pulled to tension the strip into the slip ring.

Preferably the flexible strip is clamped in position at one end by an electrically conductive member and the flexible strip is retained at the other end by a resilient means e.g. a spring. Suitably the arrangement is such that friction in the intended customary sense for applying a fastener pulls the flexible strip away from the clamped end. Advantageously both ends of the flexible strip ends are mounted on a common block so as to engage at least half of the slip ring periphery and the common block includes arcuate peripheral recesses for receiving a tension spring connected to one flexible strip end and a recess for clamping the other flexible strip end in close proximity to the slip ring. A large contact angle can so be provided in a simple manner. Preferably the slip rings are mounted separated by projecting members for tracking the flexible strips and maintaining them aligned with the sliprings. Thus the slip ring assembly locates the flexible strips axially. A common block design can be used for a variety of shaft sizes facilitating mass-production.

Conveniently the slip rings are part of a sub-assembly mounted in an impact resistant manner to the end of the shaft receiving the input torque e.g. from a power tool and an insulating key engaging the keyways in the slip rings is arranged to hold the slip rings in position. Thus the slip ring assembly contributes to the compactness and reliable performance of the torque transducer for the measuring of sudden torque inputs.

The insulating key maybe received in a sleeve journalled on the end of the shaft. The strip tension is not varied appreciably as wear takes place giving consistent performance. It is believed that debris formation will be small and not readily detract from the mechanical and electrical operation. The flexible strips can be made and replaced easily from a lamination quickly and cheaply.

DRAWINGS

DESCRIPTION OF REFERENCE TO THE DRAWINGS

Figure 1:
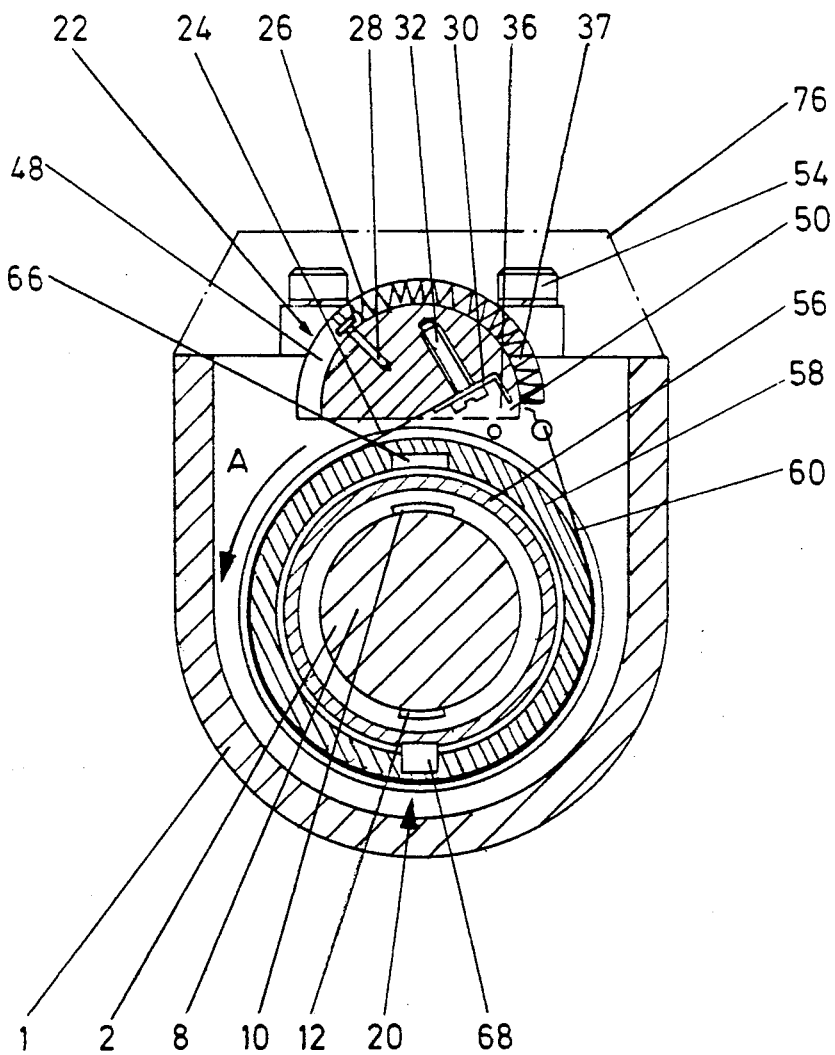
FIG. 1 shows a transverse section through a torque transducer according to the invention.

A housing 1 of a torque transducer mounts a shaft 2 between an input end bearing arrangement 4 and an outuput end bearing arrangement 6. The shaft 2 has a torque deformable, necked portion 8. An inpact or impulse tool can be connected to the tool input end 5 of the shaft 2 and the shaft has an end 7 providing an output for a socket-wrench adapter for a fastener such as a nut. Strain gauges 10 and 12 are connected to the necked portion 8 and wiring 18 is led from the strain gauges 10, 12 via soldering pads 14, 16 through a recessed shaft portion for connection to a slip ring assembly 20. A brush assembly 22 (see FIG. 1) is bolted to the housing 1 and includes four flexible strips 24 connected at one end through tension springs 26 to pins 28 and connected at the other end through a metal, electrically conductive clamping member 30 and a screw 32 to a body 37 of the brush assembly 22. Wiring 34 connected to the clamping member 30 is connected through cabling with an associated circuit located exterior of the torque transducer. Potting compound is used were convenient to immobilise the wiring 34 and the wiring 18 to provide an overall assembly mechanically resistant to sudden torque application and is shown at 36.

Figure 4:
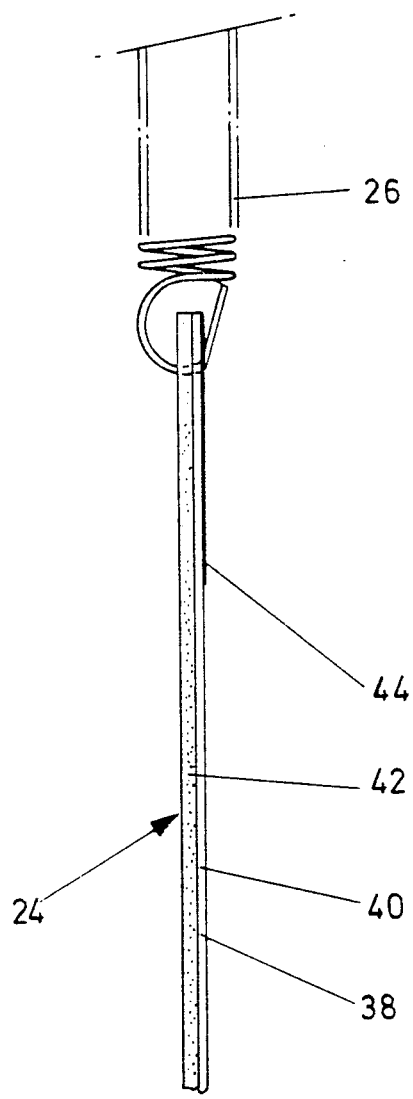
FIG. 4 is an enlarged end view of part of the brush assembly of the torque transducer of FIG. 1.

Dealing now in some more detail with the constituent parts of the torque transducer, the flexible strips 24 of the brush assemblies 20 (FIG. 4) include a backing strip 38 of a plastics material to which is attached by means of double sided adhesive tape 40 a strip 42 of a carbon material having typically a purity of substantially 99%. The end of the strip 24 connected to the spring 26 is reinforced by a strip of metal 44. The thickness of the various layers is selected so that the strip will readily bend to conform to the slip ring periphery without cracking or creasing.

Figure 3:
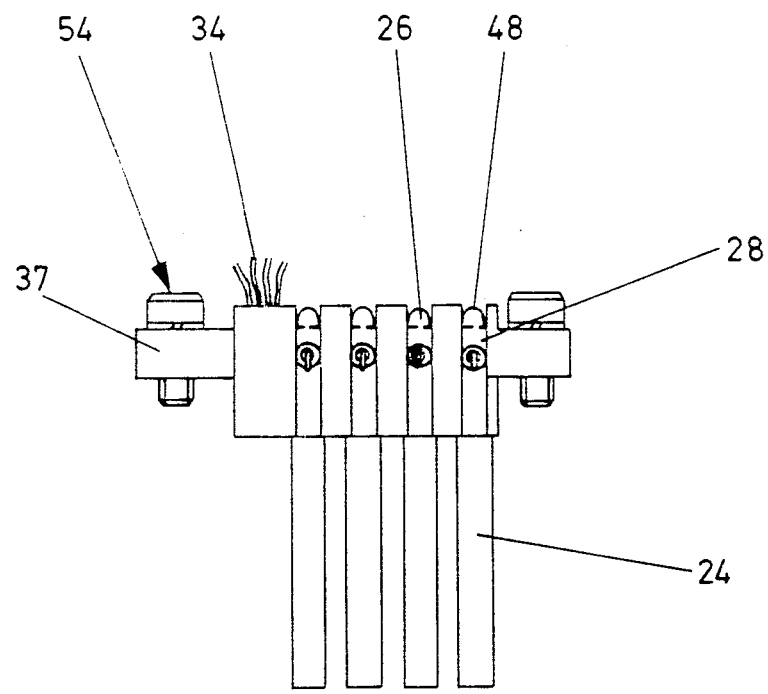
FIG. 3 shows a side elevation of the brush assembly of the torque transducer of FIG. 1.

The brush block or body 37 of brush assembly 22 (FIGS. 1 and 3) has arcuate recesses 48 for receiving the springs 26 so as to provide for the use of reasonably long springs. The block 37 has a slots 50 at the front at the position where the clamping members 30 secure the flexible strips 24. The bolts securing the brush assembly to the housing 1 are shown at 54.

Figure 2:
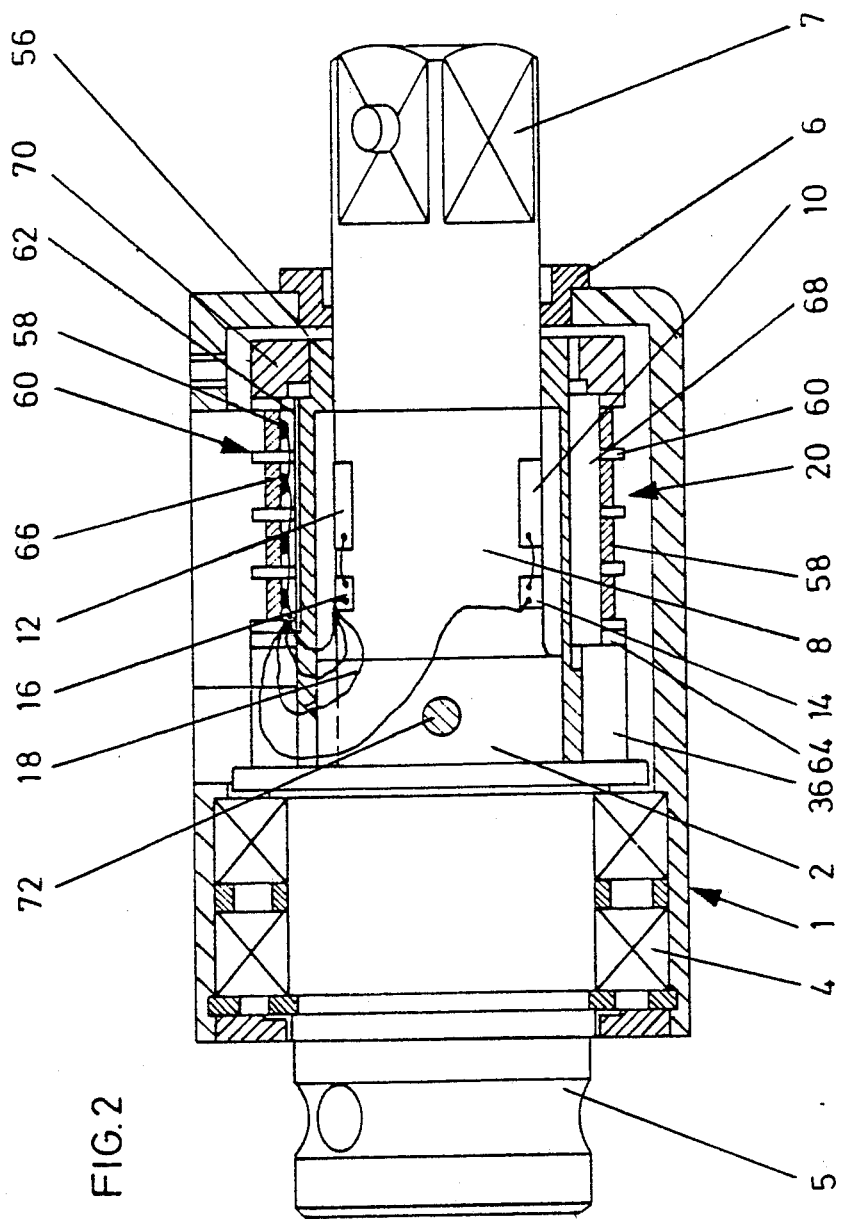
FIG. 2 shows an axial section through the torque transducer of FIG. 1 but not including a brush assembly thereof.

The slip ring assembly 20 (FIGS. 1 and 2) includes a sleeve 56 rotatable freely with respect to or journalled on the end 7 and secured, for example by means of a pin 72 to the tool input end 5. The sleeve 56 is covered by plastics insulating material forming an insulating locating radius at 62 for slip rings 58 and providing a shoulder 64 for locating the slip rings axially. The four slip rings 58 are mutually separated by means of spacers 60 of electrically insulating material. The slip rings 58 have a recess 66 which forms a channel for wiring leading towards the strain gauges 10, 12. The slip rings have further recesses forming a keyway for a key 68 of an insulating material. The slip rings 58 and spacers 60 are clamped together against the shoulder 64 by means of a locknut 70 arranged so that it tends to secure more tightly upon the application of sudden torque when torque is applied in the sense normally used for securing fasteners. In use the brush assembly 22 will be shielded by a cover 76.

Figure 5:
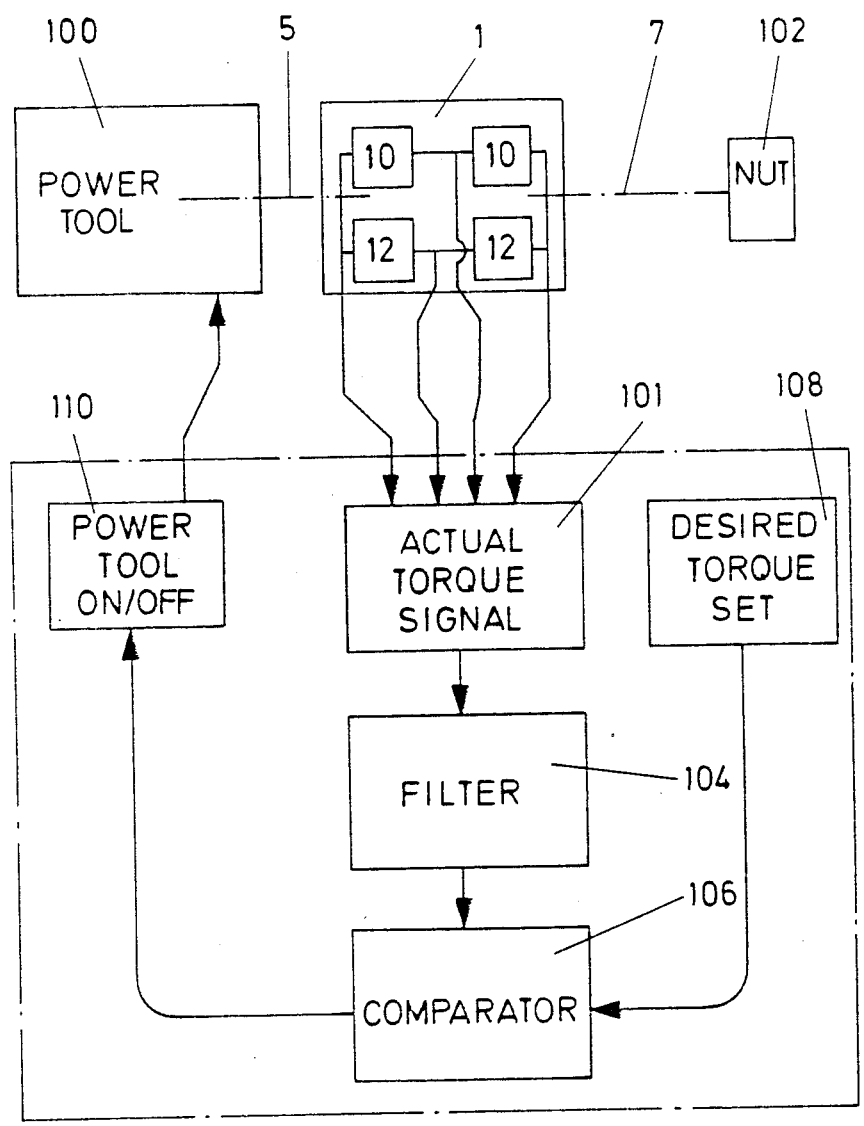
FIG. 5 is a block diagram of the control system for the torque transducer of FIG. 1.

The flexible strip 24 has a low coefficient of friction. Good contact with the slip rings 58 can be achieved at a relatively low tension applied by the spring 26. There is nearly 270° contact between the strip 24 and the slip rings 58. A meaningful torque related signal can be obtained not appreciably affected by noise arising from the brush/slip ring interface. Whilst it is prefered to rotate the slip ring in the direction of arrow A in FIG. 1 in the sense normally used for securing fasteners so that the braking effect on the slip rings 58 tends to work the strip towards the sprung strip end, the torque transducer can also be used when the shaft 2 is rotated in the opposite direction. A pair of double 45° torsion strain gauges 10, 12 are shown so that the apparatus can distinguish between torque applied in opposite senses. The strain gauges 10, 12 are connected through the slip rings/strips to an electronic circuit in a Wheatstone bridge configuration externally of the rotating shaft. FIG. 5 shows systematically an impulse tool 100 connected to the tool input end 5 and a nut 102 operated on through the output end 7. Strain gauges 10, 12 of the torque transducer Wheatstone bridge configuration output along the four channels provided by the slip rings 58 and strips 24 to a circuit 101 to generate a signal indicative of the actual torque. That signal can be passed through an RC network 104 so as to filter out noise and modulate the actual torque signal so as to make it proportional to the torque retained by the nut (see also U.S. Pat. No. 4,544,039). The torque retained signal is then passed to a comparator 106 which compares the signal with a settable reference signal from 108 to switch the power tool control circuit 110 off when the reference signal level has been reached.

The same design of brush assembly can be used for a variety of shaft sizes. The housing 1 will have to be adapted to accomodate larger or smaller shaft sizes but the same brush assembly 22 can be used subject to the use of strips 24 of appropriate length and possibly varying the springs 26 so as to provide the desired contact pressure between the flexible strips 24 and the slip rings 58.

Typically the maximum tension is from 75 g to 150 g, with lower tension levels for smaller slip ring diameters fitting on shafts providing a deformable portion of 10 millimeter diameter and high tension levels for deformable portions of 20 mm diameter. The spring rates may vary from 0.005 kg per mm for smaller diameters to 0.020 kg per mm for the larger diameters. The light operating tensions coupled with a virtually annular strip arrangement provides extremely light off-centre loads on the slip rings which can hence be made and supported so as to provide a light overall construction.

The invention provides hence a compact torque transducer providing a reliable torque measurement at low costs.

Figure 6:
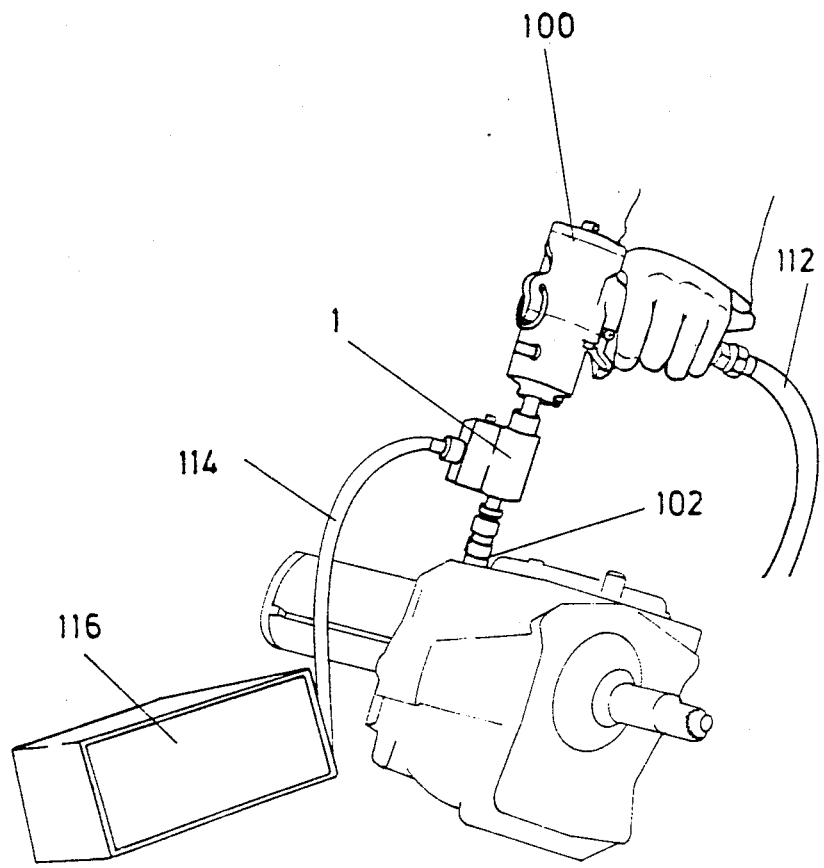
FIG. 6 is a perspective of the torque transducer in use.

With reference to FIG. 6, the tool 100 is powered through a hose 112. The output from the transducer 1 is passed by cable 114 to a box 116 containing the circuitry described by reference to FIG. 5. It can be observed that the transducer 1 is compact. In modified arrangements of course the circuitry and display from box 116 may be integrated with the tool 100.

In alternative constructions, other strip arrangements may be used including strips containing carbon fibre or other flexible conductors or the conductive material may be arranged in the form of electrically connected pads on the flexible strip, mutually spaced around an appreciable arc of the slip ring. Whilst preferably all brush/slip ring contacts are as described, where appropriate the brush arrangement of the invention may be used in conjunction with other brush arrangements.

It is also possible to use compression spring instead of a tension spring. In this case preferably there is a core element passing through the centre of the compression spring to apply tension to the strip.

Noble metal (such as hard gold) may be used to cover the slip rings. This improves corrosion resistance and permits the torque transducer to be used for accurate measurement after a prolonged rest period. The brush block is preferably of nylon, acetal or PTFE material or of other low friction material to minimise friction between the spring and the brush block.

The slip ring and brush arrangement have been described as part of a torque transducer for securing a tool of standard design. The arrangement may also be used as part of a standing fixture for calibrating the available output of impulse or impact tools. The arrangement could also be incorporated as an integral part of a purpose designed tool.

The slip ring and brush arrangement could also be of use outside the torque transducer field for transmitting electrical power or signals to or from a rotating shaft.

What is claimed is:

1. A torque transducer comprising:
   a torque deformable shaft,
   strain sensing means mounted on said shaft for generating a torque related electrical signal;
   slip ring means mounted for conjoint rotation with said shaft for receiving said torque related signal; and
   brush means electrically contacting said slip ring means for transmitting the torque related signal to an associated electrical circuit means, said brush means including:
      a first brush member comprising a flexible strip of carbon material laminated to a flexible backing strip; and
      biasing means for tensioning said first brush member to draw said carbon material against the periphery of said slip ring means.

2. The torque transducer of claim 1 wherein the backing strip is comprised of a plastic material.

3. The torque transducer of claim 1 wherein said backing strip and carbon material strip are laminated together by means of a double sided adhesive tape.

4. The torque transducer of claim 1 wherein the carbon material is selected from the group consisting of amorphous carbon and graphite.

5. The torque transducer of claim 1 wherein said brush means further comprises:
   mounting means for the flexible laminated strip; and
   clamping means formed at least in part of electrically conductive material for clamping a first end of said laminated strip to said mounting means, said clamping means being in electrical contact with said carbon material strip whereby said torque related signal may be transmitted to an associated electrical circuit means; and wherein said biasing means comprises:
   resilient means under tension between said mounting means and a second end of said flexible laminated strip, to tension said laminated strip.

6. The torque transducer of claim 1 wherein said brush means further comprises:
   at least a second brush member comprising a flexible strip of carbon material laminated to a flexible backing strip;
   biasing means for tensioning said second brush member to draw the said carbon material thereof against the periphery of said slip ring means;
   common mounting means for said brush members; and
   clamping means for affixing first ends of each of said brush member laminated strips to said mounting means.

7. The torque transducer of claim 6 wherein said biasing means each comprises:
   resilient means under tension between said mounting means and the second end of a brush member laminated strip.

8. A torque transducer comprising:
   a torque deformable shaft;
   strain sensing means mounted on said shaft for generating a torque related electrical signal;
   slip ring means mounted for conjoint rotation with said shaft for receiving said torque related signal; and
   brush means supported in electrical contact with said slip ring means for transmitting the torque related signal to an associated electrical circuit means, said brush means including:
      a plurality of flexible strips of carbon material, each of said carbon material strips being laminated to a respective flexible backing strip;
      common mounting means engaging first ends of said flexible laminated strips; and
      biasing means for independently tensioning said flexible laminated strips to draw said carbon material strips against the periphery of said slip ring means;
      said flexible laminated strips each having a length which is sufficient to envelop at least half the periphery of said slip ring means when tensioned by said biasing means.

9. The torque transducer of claim 8 wherein said common mounting means comprises a body having formed therein a plurality of arcuate peripheral recesses, one per flexible laminated strip, and, for each flexible laminated strip, clamping means recessed in and secured to said body for clamping a first end of the respective laminated strip to said body; and wherein said biasing means comprises a tension spring in each of said recesses, each tension spring being anchored at one end to said common mounting means and at the other end to a respective one of the said flexible laminated strips.

10. The torque transducer of claim 9 wherein said slip ring means comprises a plurality of slip rings separated by projecting members which are arranged for conjoint rotation with the slip rings, said members projecting from between adjacent slip rings for tracking the flexible strips to maintain alignment between the respective flexible laminated strips and their associated slip rings.

11. A torque transducer comprising:
    strain sensing means for generating torque related signals, said sensing means being configured for rotation about an axis;
    slip ring means electrically connected to said sensing means for receiving said torque related signals, said slip ring means being supported for rotation with said sensing means; and
    brush means for transmitting said torque related signals to an external electrical circuit, said brush means including:
       common mounting means juxtapositioned to said slip ring means, said mounting means having formed therein a plurality of arcuate peripheral recesses and a longitudinal recess extending substantially parallel to the axis about which said sensing means and slip ring means are rotatable;
       a plurality of clamping means located in said longitudinal recess;
       a plurality of tension springs located one in each of said peripheral recesses, each of said springs having a first end anchored on said common mounting means and a second free end; and
       a plurality of flexible electrically conductive strips, each of said flexible strips being connected at one end to the free end of a respective one of said tension springs, said flexible strips being connected at their other ends to a respective one of said clamping means, each of said flexible strips being tensioned by its associated tension spring and being drawn into electrical contact with said slip ring means over an arc of contact of more than 180° whereby electrical contact is established and maintained between said brush means and said slip ring means.

* * * * *